US009300607B1

(12) United States Patent
Buchheit

(10) Patent No.: US 9,300,607 B1
(45) Date of Patent: *Mar. 29, 2016

(54) SAVING AN EQUATION-BASED REPLACEMENT SET OF MESSAGE RECIPIENTS FOR FUTURE USE

(71) Applicant: Brian K. Buchheit, Davie, FL (US)

(72) Inventor: Brian K. Buchheit, Davie, FL (US)

(*) Notice: Subject to any disclaimer, the term of this patent is extended or adjusted under 35 U.S.C. 154(b) by 74 days.

This patent is subject to a terminal disclaimer.

(21) Appl. No.: 14/100,585

(22) Filed: Dec. 9, 2013

Related U.S. Application Data

(63) Continuation of application No. 11/380,984, filed on May 1, 2006, now Pat. No. 7,886,011, and a continuation of application No. 12/983,022, filed on Dec. 31, 2010, now Pat. No. 8,606,864.

(51) Int. Cl.
*G06F 15/16* (2006.01)
*H04L 12/58* (2006.01)
*H04L 29/12* (2006.01)

(52) U.S. Cl.
CPC ........ *H04L 51/046* (2013.01); *H04L 29/12198* (2013.01); *H04L 61/1547* (2013.01); *H04L 61/1564* (2013.01); *H04L 61/1594* (2013.01)

(58) Field of Classification Search
CPC ..................... H04L 29/12198; H04L 61/1547; H04L 61/1564; H04L 61/1594
USPC ......................................................... 709/206
See application file for complete search history.

(56) References Cited

U.S. PATENT DOCUMENTS

| | | | |
|---|---|---|---|
| 5,787,411 A | 7/1998 | Groff et al. | |
| 5,805,811 A | 9/1998 | Pratt et al. | |
| 5,923,848 A | 7/1999 | Goodhand et al. | |
| 5,963,938 A | 10/1999 | Wilson et al. | |
| 6,192,396 B1 | 2/2001 | Kohler | |
| 6,247,043 B1 | 6/2001 | Bates et al. | |
| 6,438,608 B2 * | 8/2002 | Biliris et al. | 709/245 |
| 6,529,942 B1 | 3/2003 | Gilbert | |
| 6,721,785 B1 | 4/2004 | Raghunandan | |
| 6,993,563 B2 | 1/2006 | Lytle et al. | |
| 7,209,951 B2 | 4/2007 | Goldberg | |
| 7,305,443 B2 | 12/2007 | Larsen | |
| 7,743,105 B2 * | 6/2010 | Bauchot et al. | 709/206 |
| 7,870,205 B2 | 1/2011 | LeVasseur et al. | |
| 8,019,821 B2 * | 9/2011 | Hamilton et al. | 709/206 |
| 8,234,335 B1 * | 7/2012 | Haldar et al. | 709/204 |
| 8,271,589 B2 * | 9/2012 | Phillips et al. | 709/206 |
| 2003/0026423 A1 | 2/2003 | Unger et al. | |
| 2003/0037114 A1 * | 2/2003 | Nishio et al. | 709/206 |
| 2003/0061289 A1 | 3/2003 | Clissold et al. | |

(Continued)

*Primary Examiner* — Shirley Zhang
(74) *Attorney, Agent, or Firm* — Patents on Demand P.A.; Brian K. Buchheit; Scott M. Garrett

(57) ABSTRACT

A set of recipients of an electronic message are identified. The recipients may be part of a first list. Each recipient of the first list may have had their name or other identifier (e.g., email address) entered by a user into one of various designation sections of a messaging interface. A second list is also entered into one of the various designation sections of the messaging interface. The first and second lists may be mathematically evaluated using a set operator to generate a third list. The third list may be referred to as a replacement set of recipients. Saving this third set as a new list may occur by saving an expression of a name/identifier of the first list, name/identifier of the second list, and the set operator. The saved third set may be selected for future message conveyances.

15 Claims, 4 Drawing Sheets

(56) References Cited

U.S. PATENT DOCUMENTS

| | | | |
|---|---|---|---|
| 2003/0083086 A1* | 5/2003 | Toyryla et al. | 455/518 |
| 2003/0130930 A1 | 7/2003 | Miura et al. | |
| 2004/0093382 A1 | 5/2004 | Kulkami | |
| 2004/0219936 A1* | 11/2004 | Kontiainen | 455/466 |
| 2005/0010645 A1* | 1/2005 | Arshi et al. | 709/207 |
| 2005/0117715 A1 | 6/2005 | Bordia | |
| 2005/0235038 A1 | 10/2005 | Donatella et al. | |
| 2006/0009249 A1* | 1/2006 | Fu et al. | 455/518 |
| 2006/0080393 A1 | 4/2006 | Cardone et al. | |
| 2006/0265397 A1 | 11/2006 | Bryan et al. | |
| 2007/0050456 A1* | 3/2007 | Vuong et al. | 709/206 |
| 2007/0061487 A1 | 3/2007 | Moore et al. | |
| 2008/0133580 A1* | 6/2008 | Wanless et al. | 707/102 |
| 2008/0183822 A1 | 7/2008 | Cai et al. | |
| 2008/0201433 A1 | 8/2008 | McDonald | |
| 2008/0222127 A1 | 9/2008 | Bergin | |
| 2009/0094244 A1 | 4/2009 | Hamilton et al. | |
| 2009/0106370 A1 | 4/2009 | Dreyfus et al. | |
| 2009/0113446 A1 | 4/2009 | Hamilton et al. | |
| 2009/0132490 A1 | 5/2009 | Okraglik | |
| 2009/0182820 A1 | 7/2009 | Hamilton et al. | |
| 2010/0057730 A1 | 3/2010 | Gao et al. | |

* cited by examiner

SAVING AN EQUATION-BASED REPLACEMENT SET OF MESSAGE RECIPIENTS FOR FUTURE USE

CROSS-REFERENCE TO RELATED APPLICATIONS

This application claims the benefit of U.S. patent application Ser. No. 11/380,984, filed 1 May 2006 now U.S. Pat. No. 7,886,011 and U.S. patent application Ser. No. 12/983,022, filed 31 Dec. 2010 soon issued as U.S. Pat. No. 8,606,864.

The entire contents of U.S. application Ser. No. 11/380,984 and U.S. application Ser. No. 12/983,022 are incorporated by reference herein.

BACKGROUND

The disclosure relates to the field of messaging and, more particularly, to the saving an equation-based replacement set of message recipients for future use.

Email plays a large part in personal and business communications. When sending an email to a large number of recipients, users must enter an identifier for each addressee and/or specify a distribution list containing a static group of previously defined addressees. Large groups of addressees and/or distribution lists can be difficult to manage. Many email applications have the ability to categorize addressees and distribution lists. This ability allows users to organize addressees and distribution lists into user defined recipient groups, such as "Family" or "Coworkers". When graphically selecting recipient groups, users can choose to view only those recipients and distribution lists associated with a defined group.

Despite conventional organizational aids, email applications that support conventional distribution lists lock users into an all-or-nothing arrangement. The applications do not allow a user to send an email to a subset of addressees in a distribution list, such as excluding a specific email address from the list. Instead, users must resort to manually editing the distribution list members or manually selecting individual email addresses. This limitation can be tedious and frustrating to users who desire to send email to a large set of recipients that is similar but not identical to a set of addressees specified within an existing distribution list.

Another problem with many existing implementations of distribution lists is that users cannot combine multiple distribution lists to create a single list that includes all members without a duplication of email addresses. Users can select multiple distribution lists as recipients. However, if an email address appears in multiple lists, this recipient can be sent the email message multiple times. This amount of extraneous email can be taxing on the receiver's email system by consuming more space than necessary. In turn, these extraneous emails can cause the receiver's email inbox to reach capacity faster and, therefore, reject other pertinent messages.

To cope with these shortcomings, many users create a multiplicity of distribution lists with minor differences in an attempt to overcome the inherent static nature of conventional distribution lists. The quantity of modified distribution lists necessary to account for even the most probable permutations is astronomical and increases exponentially as the size and quantity of lists increase. These lists can consume additional storage space, which can degrade the overall performance of the email system. Additionally, the user is challenged with having to constantly decipher somewhat cryptic names often assigned to a plethora of similar distribution lists.

BRIEF DESCRIPTION OF THE DRAWINGS

There are shown in the drawings, embodiments which are presently preferred, it being understood, however, that the disclosure is not limited to the precise arrangements and instrumentalities shown.

DETAILED DESCRIPTION OF THE INVENTION

Figure 1:
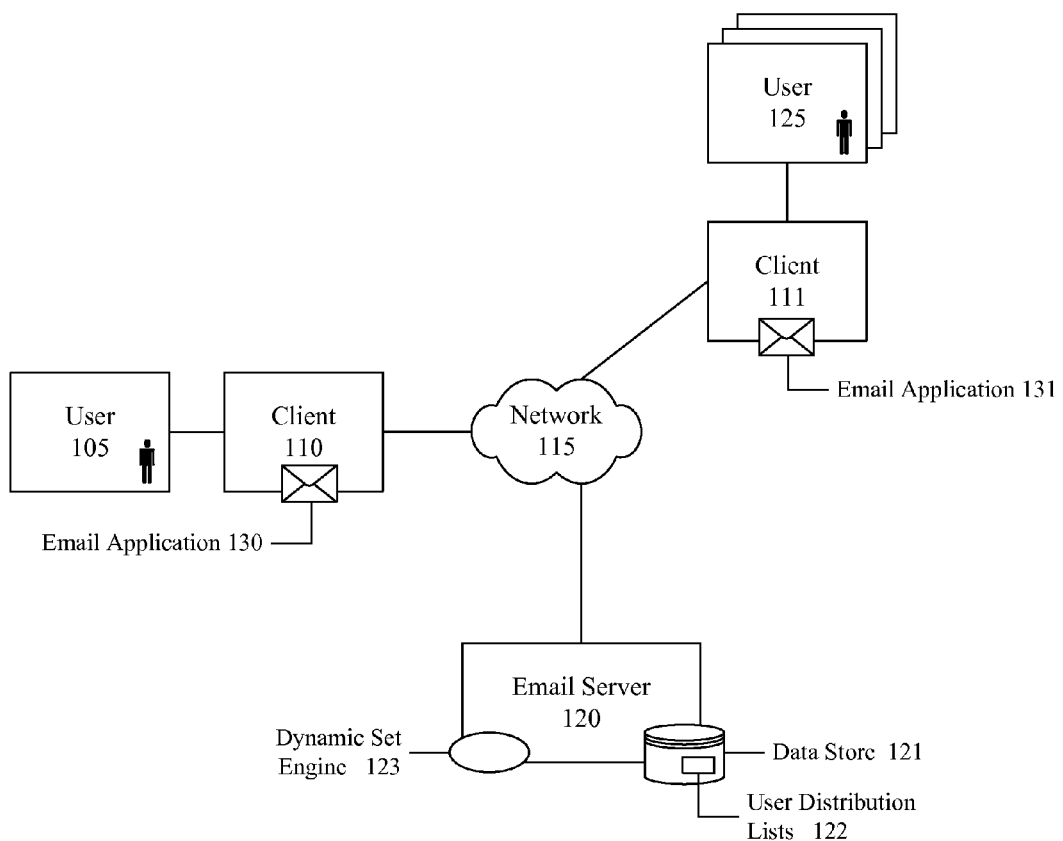
FIG. 1 is a schematic diagram of a system for sending electronic mail in accordance with an embodiment of the inventive arrangements disclosed herein.

One embodiment of the disclosure identifies a set of recipients of an electronic message. The recipients may be part of a first list. Each recipient of the first list may have had their name or other identifier (e.g., email address) entered by a user into one of various designation sections of a messaging interface. A second list is also entered into one of the various designation sections of the messaging interface. The first and second lists may be mathematically evaluated using a set operator to generate a third list. The third list may be referred to as a replacement set of recipients. Set operator may, for example, exclude recipients of the second list that are in the first list, so that the resulting third list (replacement set) includes those recipients in the first lists and not in the second. The third list is saved for future use. Saving this third set as a new list may occur by saving an expression of a name/identifier of the first list, name/identifier of the second list, and the set operator. The new list (the resulting set or the third list) is thereafter able to be utilized to define the replacement set. Whenever the first list or the second list is changed (since the new list is saved by expression), the third list (new list) is dynamically or automatically updated in a corresponding fashion. This may minimize maintenance of complex distribution lists with significant interdependencies. The disclosure may also prevent erroneous sets of recipients from receiving messages which commonly occurs when one enumerated list is updated for a change of people but an associated/corresponding list of many of the same people is not updated in a consistent fashion.

Embodiments of the disclosure permits users of email applications to modify existing email distribution lists through the use of set operations. More specifically, this disclosure permits a user to specify a first set of email recipients, a second set of email recipients, and a set operation. A third set of email recipients can be automatically generated by performing the set operation upon the first set and the second set. An email message can then be sent to each recipient in the third set. It should be understood that the present invention can combine any number of sets to generate a resultant set and is not to be construed as limited to embodiments where two sets are combined to generate a third set.

Embodiments of the disclosure can be implemented in accordance with numerous aspects consistent with the material presented herein. For example, one aspect of the disclosure can include a software method for specifying email recipients that includes a graphical user interface that is associated with an email application. Within the graphical user interface, a user specified distribution list, a user specified set operation, and one or more user specified email recipients can be identified. Software algorithms can automatically generate a set of intended email recipients by performing the set operation upon the distribution list and the at least one email recipient.

Another aspect of the disclosure can include a graphical user interface (GUI) for sending email. The GUI can include a recipient designation section and a set operation designation section. A set of intended email recipients can be automatically generated by a software program that performs a set operation specified in the set operation designation section against at least two sets of recipients specified in the recipient designation section.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

As will be appreciated by one skilled in the art, aspects of the present disclosure may be embodied as a system, method or computer program product. Accordingly, aspects of the present invention may take the form of an entirely hardware embodiment, a software embodiment (including firmware, resident software, micro-code, etc.) where the software embodiment can include a storage medium (which can be a tangible, physical, non-transitory storage medium) within which the software resides, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer program stored on a computer readable storage medium may be propagated over a distance via a computer readable signal medium.

The computer readable storage medium can be a tangible, non-transitory medium. The computer readable storage medium can be a physical device or part of a physical device in which information is digitally encoded. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning to the figures, FIG. 1 is a schematic diagram of a system 100 for sending electronic mail in accordance with an embodiment of the inventive arrangements disclosed herein. In system 100, user 105 can send an email via email application 130 running on client 110. Email application 130 can be any of a variety of email system interfaces including, but not limited to, a software client, a Web page, a thin client, an applet, and the like. Client 110 can be any of a variety of computing devices including, but not limited to, a personal computer, a kiosk, a personal data assistant (PDA), a mobile phone, and the like.

Client 110 can operate in a stand-alone fashion. Alternatively, client 110 can be a device that cooperatively participates in a network of distributed computing devices. Network 115 can facilitate data exchanges over wireless as well as line-based communication pathways and protocols.

Email application 130 communicates with email server 120 via client 110 and network 115. Email server 120 includes data store 121, which contains user distribution lists 122, and dynamic set engine 123. User distribution lists 122 can include one or more previously defined addressees. User 105 can access user distribution lists 122 for use in email application 130.

Dynamic set engine 123 can include a set of machine-readable instructions for performing dynamic set operations upon user selected recipients and/or previously established distribution lists. Dynamic set engine 123 can be implemented in a variety of manners including, but not limited to, a web service, a server application, a client application, an email server application plug-in component, and the like. Dynamic set engine 123 can receive data from email application 130 and/or data store 121 via network 115. Results from the processing of data can be displayed in email application 130 and stored in data store 121, expanding the contents of user distribution lists 122. In another embodiment, dynamic set engine 123 can reside on client 110.

User 125 can access an email via email application 131 running on client 111. Email application 131 can be any of a variety of email system interfaces including, but not limited to, a software client, a Web page, a thin client, an applet, and the like. Client 111 can be any of a variety of computing devices including, but not limited to, a personal computer, a kiosk, a personal data assistant (PDA), a mobile phone, and the like. Client 111 can operate in a stand-alone fashion. Alternatively, client 110 can be a device that cooperatively participates in a network of distributed computing devices.

Figure 2:
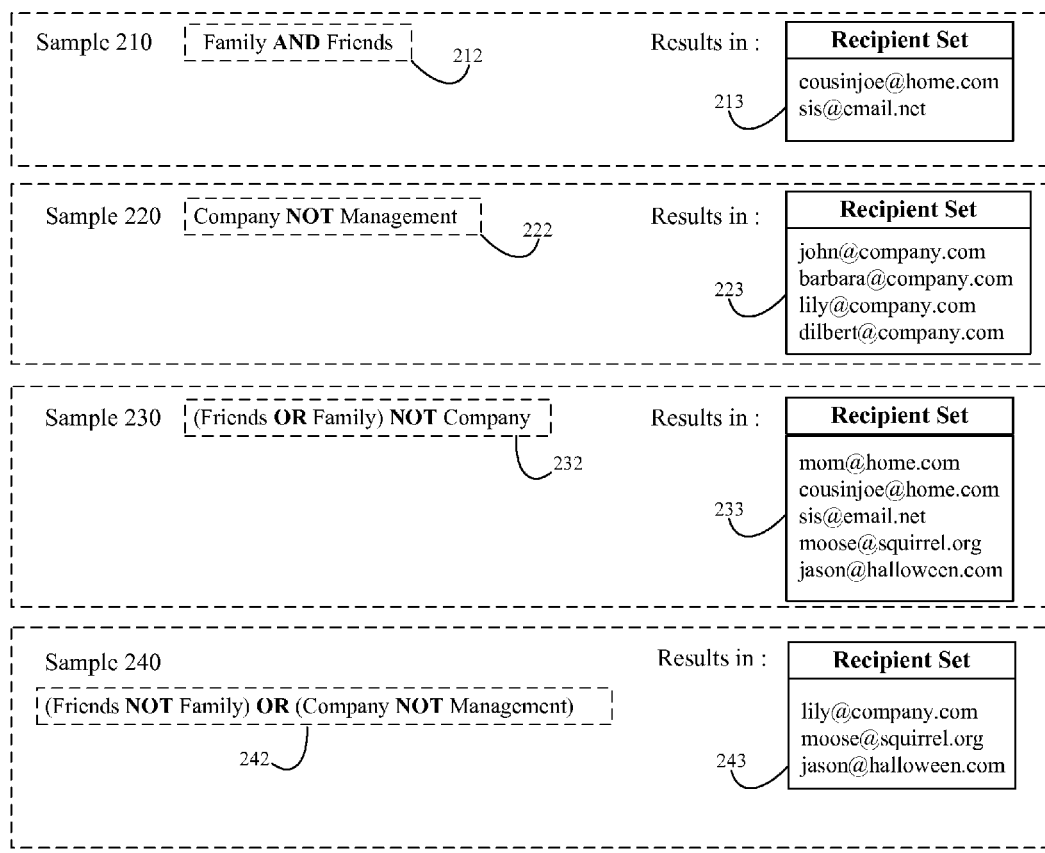
FIG. 2 illustrates a collection of sample user distribution lists and sample operations on the sample user distribution lists.

FIG. 2 illustrates a collection 200 of sample user distribution lists and sample operations on the sample user distribution lists. For illustrative purposes, four distribution lists, Family 201, Friends 202, Company 203, and Management 204, are defined with fictitious email addresses. Family 201 can include email addresses such as mom@home.com, sis@email.net, and cousinjoe@home.com. Friends 202 can include email addresses such as lily@company.com, amy@company.com, cousinjoe@home.com, sis@email.net, moose@squirrel.org, and jason@halloween.com. Company 203 can include email addresses such as john@company.com, barabara@company.com, amy@company.com, steve@company.com, lily@company.com, and dilbert@company.com. Management 204 can include email addresses such as amy@company.com, catbert@hr.net, and steve@company.com.

Sample 210 includes recipient definition 212 and recipient set 213. Recipient set 213 is generated by performing the set operation in recipient definition 212. In this example, recipient set 213 contains those email addresses that exist in both Family 201 and Friends 202.

Sample 220 includes recipient definition 222 and recipient set 223. Recipient set 223 is generated by performing the set operation in recipient definition 222. In this example, recipient set 223 contains those email addresses that exist in Company 203 that are not a member of Management 204.

Sample 230 includes recipient definition 232 and recipient set 233. Recipient set 233 is generated by performing the set operations in recipient definition 232. Order of operation preference is designated by the use of parentheses in recipient definition 232. In this example, recipient set 233 contains those email addresses that exist in either Family 201 or Friends 202, but not in Company 203.

Sample 240 includes recipient definition 242 and recipient set 243. Recipient set 243 is generated by performing the set operations in recipient definition 242. Order of operation preference is designated by the use of parentheses in recipient definition 242. In this example, recipient set 243 contains those email addresses that exist in Friends 202 but not Family 201, or Company 203 but not Management 204.

Figure 3:
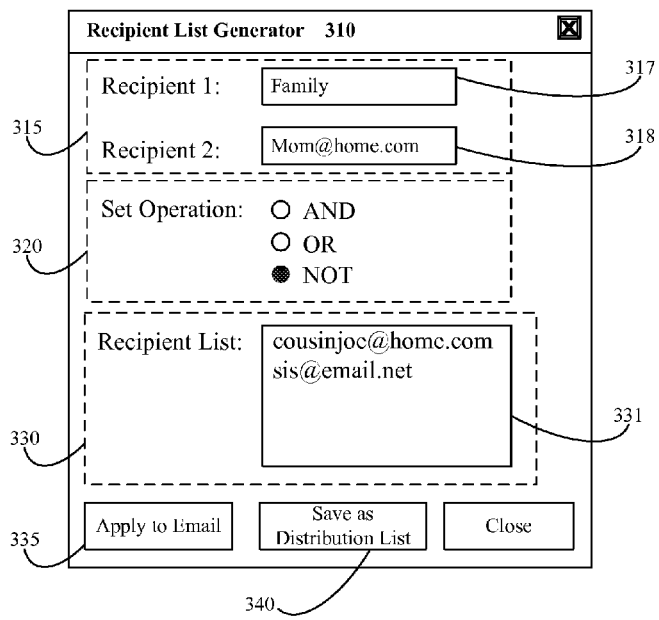
FIG. 3 illustrates a collection of graphical user interfaces (GUIs) for a system that supports dynamic set operations when specifying email recipients in accordance with an embodiment of the inventive arrangements disclosed herein.
Figure 3:
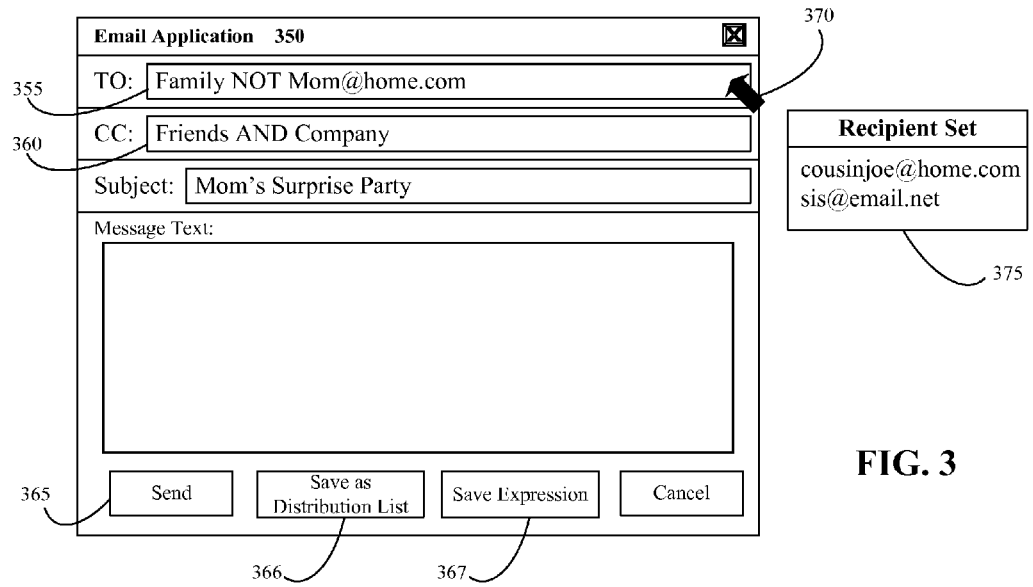

FIG. 3 illustrates a collection 300 of graphical user interfaces (GUIs) for a system that supports dynamic set operations when specifying email recipients in accordance with an embodiment of the inventive arrangements disclosed herein. Recipient list generator GUI 310 can be an external interface to email application 130 of system 100 and can reside on either client 110 or email server 120. Additionally, recipient list generator GUI 310 can utilize the sample user distribution lists of collection 200.

Recipient list generator GUI 310 can include recipient designation section 315, set operation designation section 320, resultant recipient section 330, apply button 335, and save button 340. Recipient designation section 315 can include first set designator 317 and second set designator 318. A user of recipient list generator GUI 310 can specify an email address or a previously established email distribution list in first set designator 317 and second set designator 318. Designation of an email address or previously established email distribution list in first set designator 317 or second set designator 318 can be performed in any of a variety of mechanisms including, but not limited to, input by a user via a keyboard, selection by an user from a drop-down list, a copy-and-paste function performed by a user, selection by an user from a pop-up menu, and the like.

Set operation designation section 320 can contain a graphical display of user selectable set operations. Set operation designation section 320 can be any of a variety of selection mechanisms including, but not limited to, radio buttons, a drop-down list, a pop-up menu, a combo box, and the like.

Resultant recipient section 330 can include resultant recipient set 331. Resultant recipient set 331 displays the results of the operation selected in set operation designation section 320 upon the first set designator 317 and second set designator 318 of the recipient designation section 315. Resultant recipient section 330 can be any of a variety of display methods including, but not limited to, a pop-up window, a fly-over window, a GUI display window, an applet, and the like. Modifications to the contents of resultant recipient set 331 can be made by a user via a mechanism such as a right-click pop-up menu or typing.

Selection of apply button 335 by a user transmits the contents of resultant recipient set 331 to email application 130 of system 100. Selection of save button 340 by a user stores the contents of resultant recipient set 331 in data store 121 of email server 120 of system 100.

Email application GUI 350 can be an interface of email application 130 of system 100 and can reside on either client 110 or email server 120. Additionally, email application GUI 350 can utilize the sample user distribution lists of collection 200.

Email application GUI 350 can include primary recipient designation 355, copy recipient designation 360, a blind copy recipient designation (not shown), and the like. Primary recipient definition 355 and copy recipient definition 360 can accept user input of email addresses, previously established distribution lists, and set operations. Primary recipient definition 355 and copy recipient definition 360 can accept any of a variety of input methods including, but not limited to, a cut-and-paste function, a keyboard, a point-and-click function, a drop-down list, and the like.

Cursor 370 can represent a graphical pointer associated with a computing device. The placement of cursor 370 over primary recipient definition 355 by a user results in the appearance of recipient set window 375. Recipient set window 375 can be a display for the results of the set operation defined in primary recipient definition 355. Recipient set window 375 can be any of a variety of display methods including, but not limited to, a pop-up window, a flyover pop-up window, an application window, and the like.

The selection of send button 365 by a user results in the dispatching of the email to the email addresses designated by primary recipient definition 355 and copy recipient definition 360. The selection of the save list button 366 by a user stores the contents of recipient set 375 which contains the list as defined by primary recipient definition 355, copy recipient definition 360, or both in data store 121 of email server 120 of system 100. The selection of save expression button 367 stores the contents of either primary recipient definition 355 or copy recipient definition 360 or both for future reuse.

It should be appreciated that interfaces 310 and 350 are provided to demonstrate concepts described for an embodiment of the inventive arrangements disclosed herein. Interfaces 310 and 350 are not intended to constrain the scope of the invention to a particular contemplated expression. Derivatives of interfaces 310 and 350 including different interface elements, arrangements, layouts, and the like are contemplated herein. Further, although examples shown in interfaces 310 and 350 illustrate two sets being combined to generate a third recipient set, the invention is not to be limited in this regard. That is, any number of recipient sets or distribution lists can be combined to generate a resultant recipient set or dynamic distribution list.

Figure 4:
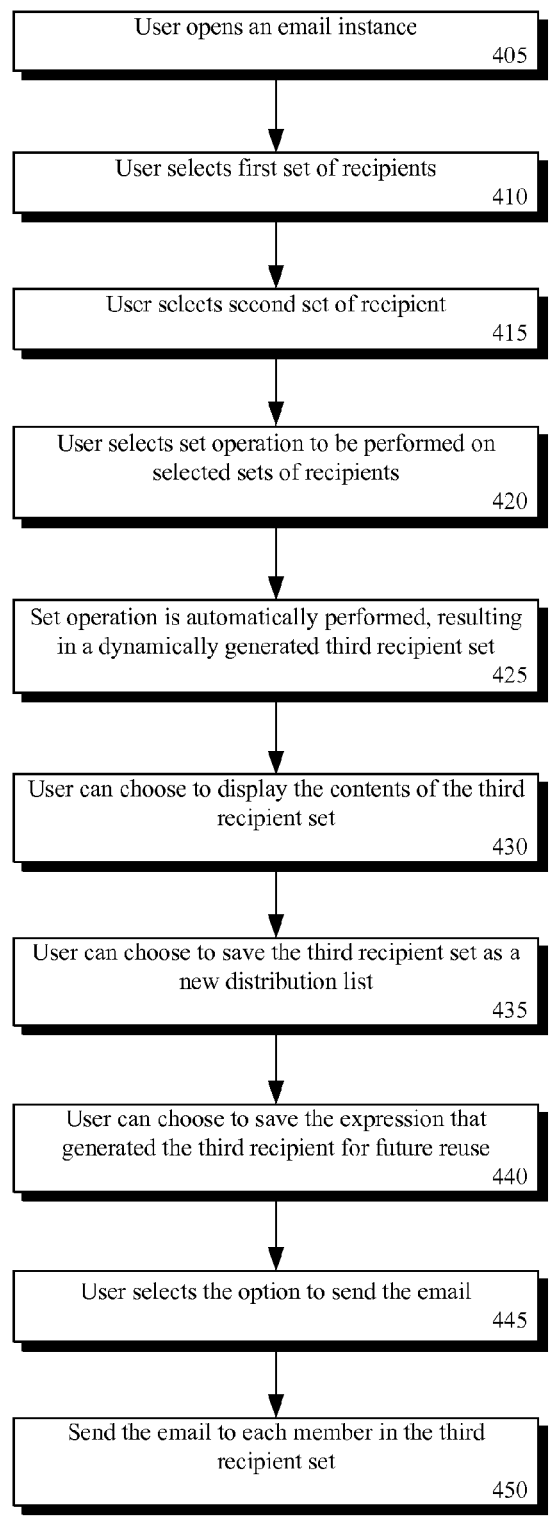
FIG. 4 is a flow chart of a method for the use of dynamic set operations when specifying email recipients in accordance with an embodiment of the inventive arrangements disclosed herein.

FIG. 4 is a flow chart of a method 400 for the use of set operations when specifying email recipients in accordance with an embodiment of the inventive arrangements disclosed herein. Method 400 can be performed in the context of system 100 or in the context of any other system allowing the composition and sending of email. Additionally, method 400 can be performed in the context of recipient list generator GUI 310 or email application GUI 350 or in the context of any other GUI that supports the performing of set operations on recipient lists.

Method 400 can begin in step 405, where a user opens an email instance. In step 410, a user selects their first set of recipients. The first set of recipients can be any of a variety of email addressee representations including, but not limited to, a single email address, a name of a previously established distribution list of email addresses, an identifier that is associated with an email address, and the like. A second distribution list is selected in step 415. The second set of recipients can be any of a variety of email addressee representations including, but not limited to, a single email address, a name of a previously established distribution list of email addresses, an identifier that is associated with an email address, and the like.

In step 420, a set operation is selected by a user that is to be performed upon the sets of recipients selected in steps 410 and 415. Step 425 is the performance of the set operation designated in step 420 upon the sets of recipients identified in steps 410 and 415, resulting in a dynamically generated third recipient set. A user can choose to display the contents of the third recipient set graphically in step 430. The contents of the third recipient set can be displayed in any of a variety of methods including, but not limited to, a pop-up window, a flyover pop-up window, an application window, a text box, and the like. In step 435, a user can choose to save the contents of the third recipient set for future reuse as an established distribution list in data store 121 of email server 120 of system 100. The expression used to generate the third recipient set can be saved by a user for future reuse in step 440. In step 445, a user selects the option to send the email. Step 450 sends the email to each member of the third recipient set.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method comprising:

at least one of one or more computing devices identifying a first distribution list and a second distribution list of email message recipients, wherein the first distribution list comprises two or more of the email message recipients, wherein the second distribution list comprises one or more of the email message recipients, wherein the first distribution list and the second distribution list are entered by a user into one of various designation sections of an email messaging interface of an email messaging application;

at least one of the one or more computing devices mathematically evaluating the first distribution list and the second distribution list with a set operator resulting in a third list, wherein the third list is a replacement list of the email message recipients;

at least one of the one or more computing devices saving an expression that comprises a replacement list name for the replacement list, a name or other representation for the first distribution list, a name or other representation for the second distribution list, and the set operator, wherein the saving is for future use of the replacement list referenced by replacement list name as a new distribution list for sending email messages, wherein each of the one or more computing devices comprises one or more processors, one or more non-transitory storage mediums, and program instructions stored on the one or more non-transitory storage mediums, wherein the one or more processors execute the program instructions; and after saving the replacement list name, at least one of the one or more computing devices receiving and saving a change to the two or more email recipients in the first distribution list or at least one of the computing devices receiving and saving a change to the one or more recipients in the second distribution list;

if the change to the first distribution list is made and after the change to the first distribution list is made, at least one of the one or more computing devices receiving an entry of the replacement list name within one of the various designation sections of the email messaging interface, wherein the replacement list name is evaluated using the expression by mathematically evaluating the first list as changed and the second list with the set operator; and if the change to the second distribution list is made and after the change to the second distribution list is made, at least one of the one or more computing devices receiving an entry of the replacement list name within one of the various designation sections of the email messaging interface, wherein the replacement list name is evaluated using the expression by mathematically evaluating the first distribution list and the second distribution list as changed with the set operator.

2. The method of claim 1, further comprising:
after the replacement list name is saved, at least one of the one or more computing devices receiving an entry of the replacement list name within one of the various designation sections of the email messaging interface, wherein the replacement list name is evaluated by at least one of the one or more computing devices using the expression by mathematically evaluating the first distribution list and the second distribution list with the set operator.

3. The method of claim 1, wherein evaluation of the set operator results in the third list consisting of the two or more email recipients of the first distribution list excluding the one or more email recipients of the second distribution list.

4. The method of claim 1, wherein evaluation of the set operator results in the third list consisting of a subset of the two or more email recipients of the first distribution list that are also included in the one or more email recipients of the second distribution list.

5. The method of claim 1, wherein the various designation sections comprise a TO section, a CC section, and BCC section.

6. The method of claim 1, wherein the email messaging interface of the email messaging application supports set operators of AND, OR, and NOT.

7. A computer program product comprising:
one or more non-transitory storage mediums storing program instructions;
the program instructions executable by one or more processors to:
identify a first distribution list and a second distribution list of email message recipients, wherein the first distribution list comprises two or more of the email message recipients, wherein the second distribution list comprises one or more of the email message recipients, wherein the first distribution list and second distribution list are entered by a user into one of various designation sections of an email messaging interface of an email messaging application;

mathematically evaluate the first distribution list and the second distribution list with a set operator resulting in a third list, wherein the third list is a replacement list of the email message recipients;

save an expression that comprises a replacement list name for the replacement list, a name or other representation for the first distribution list, a name or other representation for the second distribution list, and the set operator, wherein the saving is for future use of the replacement list referenced by replacement list name;

after saving the replacement list name, receive and save a change to the two or more email recipients in the first distribution list or receive and save a change to the one or more recipients in the second distribution list;

if the change to the first distribution list is made and after the change to the first distribution list is made, receive an entry of the replacement list name within one of the various designation sections of the email messaging interface, wherein the replacement list name is evaluated using the expression by mathematically evaluating the first list as changed and the second list with the set operator; and if the change to the second distribution list is made and after the change to the second distribution list is made, receive an entry of the replacement list name within one of the various designation sections of the email messaging interface, wherein the replacement list name is evaluated using the expression by mathematically evaluating the first distribution list and the second distribution list as changed with the set operator.

8. The computer program product of claim 7, wherein evaluation of the set operator by the program instructions results in the third list consisting of the two or more email recipients of the first distribution list excluding the one or more email recipients of the second distribution list.

9. The computer program product of claim 7, wherein evaluation of the set operator by the program instructions results in the third list consisting of a subset of the two or more email recipients of the first distribution list that are also included in the one or more email recipients of the second distribution list.

10. The computer program product of claim 7, wherein the various designation sections comprise a TO section, a CC section, and BCC section.

11. The computer program product of claim 7, wherein the email messaging interface of the email messaging application supports set operators of AND, OR, and NOT.

12. A computing device comprising:
one or more processors;
one or more non-transitory storage mediums;
program instructions stored on the one or more non-transitory storage mediums, wherein the one or more processors execute the program instructions to:
identify a first distribution list and a second distribution list of email message recipients, wherein the first distribution list comprises two or more of the email message recipients, wherein the second distribution list comprises one or more of the email message recipients, wherein the first distribution list and second distribution list are entered by a user into one of various designation sections of an email messaging interface of an email messaging application;

mathematically evaluate the first distribution list and the second distribution list with a set operator resulting in a third list, wherein the third list is a replacement list of the email message recipients; and save an expression that comprises a replacement list name for the replacement list, a name or other representation for the first distribution list, a name or other representation for the second distribution list, and the set operator, wherein the saving is for future use of the replacement list referenced by replacement list name;

after saving the replacement list name, receive and save a change to the two or more email recipients in the first distribution list or receive and save a change to the one or more recipients in the second distribution list;

if the change to the first distribution list is made and after the change to the first distribution list is made, receive an entry of the replacement list name within one of the various designation sections of the email messaging interface, wherein the replacement list name is evaluated using the expression by mathematically evaluating the first list as changed and the second list with the set operator; and if the change to the second distribution list is made and after the change to the second distribution list is made, receive an entry of the replacement list name within one of the various designation sections of the email messaging interface, wherein the replacement list name is evaluated using the expression by mathematically evaluating the first distribution list and the second distribution list as changed with the set operator.

13. The computing device of claim 12, wherein evaluation of the set operator by the computing device results in:

the third list consisting of the two or more recipients of the first list excluding the one or more recipients of the second list, or the third list consisting of a subset of the two or more recipients of the first list that are also included in the one or more recipients of the second list.

14. The computing device of claim 12, wherein the various designation sections comprise a TO section, a CC section, and BCC section.

15. The computing device of claim 12, wherein the email messaging interface of the email messaging application supports set operators of AND, OR, and NOT.

\* \* \* \* \*